(12) United States Patent
Heyworth et al.

(10) Patent No.: US 7,881,702 B2
(45) Date of Patent: Feb. 1, 2011

(54) INTERACTIVE ENTERTAINMENT, SOCIAL NETWORKING, AND ADVERTISING SYSTEM

(75) Inventors: Alejandro Heyworth, Minneapolis, MN (US); R. Keith Aufhauser, New York, NY (US)

(73) Assignee: SocializeIT, Inc., Cambridge, MA (US)

( * ) Notice: Subject to any disclaimer, the term of this patent is extended or adjusted under 35 U.S.C. 154(b) by 855 days.

(21) Appl. No.: 11/685,045

(22) Filed: Mar. 12, 2007

(65) Prior Publication Data

US 2008/0227500 A1 Sep. 18, 2008

(51) Int. Cl.
*H04M 3/42* (2006.01)
(52) U.S. Cl. ............... 455/414.1; 455/414.2; 455/41.2; 455/414.3; 455/421; 705/14; 379/114
(58) Field of Classification Search ............... 455/414.1, 455/414.2, 41.2, 414.3, 421, 406, 407, 408; 705/14, 26; 379/114
See application file for complete search history.

(56) References Cited

U.S. PATENT DOCUMENTS

| | | | |
|---|---|---|---|
| 5,465,384 A | 11/1995 | Bejan et al. | |
| 6,257,982 B1 | 7/2001 | Rider et al. | |
| 6,346,045 B2 | 2/2002 | Rider et al. | |
| 6,663,105 B1 * | 12/2003 | Sullivan et al. | 273/138.2 |
| 6,763,226 B1 * | 7/2004 | McZeal, Jr. | 455/90.2 |
| 7,107,009 B2 * | 9/2006 | Sairanen et al. | 455/41.1 |
| 7,107,236 B2 * | 9/2006 | Lei | 705/27 |
| 7,343,317 B2 * | 3/2008 | Jokinen et al. | 705/14.64 |
| 7,463,898 B2 * | 12/2008 | Bayne | 455/466 |
| 7,555,289 B2 * | 6/2009 | Kim | 455/414.1 |
| 2005/0039210 A1 * | 2/2005 | Dusenberry et al. | 725/81 |
| 2005/0239551 A1 | 10/2005 | Griswold et al. | |
| 2006/0101116 A1 * | 5/2006 | Rittman et al. | 709/204 |
| 2008/0096659 A1 * | 4/2008 | Kreloff et al. | 463/39 |
| 2008/0120186 A1 * | 5/2008 | Jokinen et al. | 705/14 |
| 2009/0234945 A1 * | 9/2009 | Chande et al. | 709/224 |

* cited by examiner

*Primary Examiner*—Minh D Dao
(74) *Attorney, Agent, or Firm*—Schwegman, Lundberg & Woessner, P.A.

(57) ABSTRACT

A system includes a personal wireless mobile communication device that is configured to transmit a short-range wireless signal. The short-range wireless signal is processed by a server, and the server executes an action based on the short-range wireless signal. In an embodiment, the action executed by the server is the creation of an Interactive session on a display unit as a function of the short-range wireless signal.

5 Claims, 3 Drawing Sheets

INTERACTIVE ENTERTAINMENT, SOCIAL NETWORKING, AND ADVERTISING SYSTEM

TECHNICAL FIELD

Various embodiments relate to Interactive entertainment and education, social networking, meeting interaction, information dissemination, and advertising systems.

BACKGROUND

Personal wireless mobile communication devices, such as mobile telephones and personal digital assistants (PDAs), have become widespread in use in the last several years. Such devices permit a person to be immediately accessible for voice and data transmissions at virtually anytime and anyplace. While these technologies have enabled people to become more connected in the digital domain, they unfortunately have had the side effect of isolating these very same people in the physical domain. A system that bridges the gap between the physical and digital domains created by these devices and technologies would enhance the value and usefulness of these devices.

DETAILED DESCRIPTION

Figure 1:
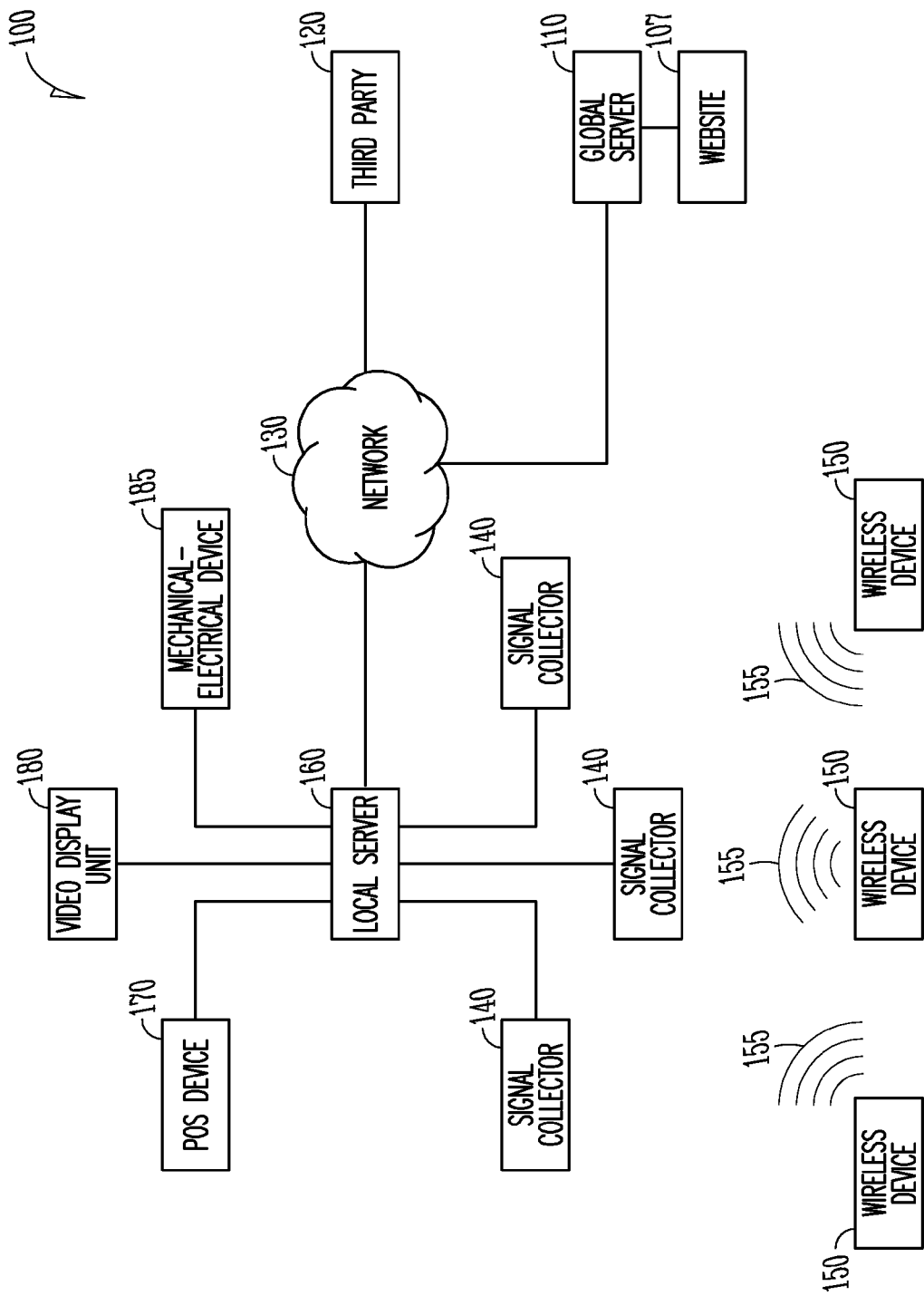
FIG. 1 illustrates an embodiment of an Interactive system.

In an example Interactive system, a personal wireless mobile communication device is downloaded with client software that permits the wireless device to transmit short-range wireless signals. These short-range wireless signals are received and processed by a signal collector or a server, and the server further processes the signals so that the user can participate in a potentially multi-user, Interactive session displayed on a display unit. In some example systems, the display unit is in a public place, and many users can interact with each other using their personal wireless mobile communication devices. In example systems, multiple servers and multiple display units are coupled together via a global network, thereby enabling persons in different geographic locations to interact with each other, each user using the server and the display unit at his or her location. Moreover, groups of people may collectively remotely interact with other groups of people. That is, local servers can be located in any geographic location throughout the world, and through a network coupling the local servers, a global server, and personal wireless mobile communication devices, each local server (and each personal wireless mobile communication device) has access to any other personal wireless mobile communication device through the network. In such embodiments, the network may act as a social network for all the persons participating in the interaction. In another embodiment, the interaction may involve a real-time game on the display unit in which all users can participate using their personal wireless mobile communication device. For example, a game of tag can be played on the display unit using icons on the display unit. Furthermore, advertising may be placed on the display unit during the game or other interaction, and/or advertising or other information may also be sent to the display on the personal wireless mobile communication devices that are involved in the interaction. The Interactive system can handle the creation and placement of the advertising, and further include functionalities such as remote sales, billing, auditing, and reporting of Interactive advertisements. This information transmitted to the personal wireless mobile communication device may be static (e.g., still advertisements and graphics), dynamic (e.g., polls, quizzes, and rankings), and/or downloadable (e.g., music, ringtones, photos, video). In another example system, a person participating in the interaction may receive an incentive for his or her participation.

In this disclosure, a personal wireless mobile communication device includes, but is not limited to, a mobile telephone, a personal digital assistant (PDA), a palmtop communication device, and a laptop computer. The term personal wireless mobile communication device is further meant to include future-developed technologies. The short-range wireless signal includes any signal with a transmission range up to approximately 100 meters. However, some short-range wireless technologies have been modified to transmit such signals up to a mile or so. Such short-range wireless technologies includes, but are not limited to, Bluetooth, Wi-Fi (802.11x), Wireless Firewire, Wireless USB, WiMax, UWB, RFIDs, WiBree, and Zigbee signals and protocols. The term short-range wireless signal is further meant to include future-developed technologies. The term display unit includes, but is not limited to, a video display unit, a movie theatre screen, a large HD display unit such as a JumboTron® display unit, an electronic scoreboard, a display unit in a commercial establishment, an electronic billboard, a television display unit (e.g., plasma, CRT, projection, etc.), an electronic poster, a kiosk, a display unit in a classroom, and a display unit in an airplane or other transportation vehicle. The term display unit is further meant to include future-developed technologies. The term public includes, but is not limited to, any gathering of two or more people, whether it be in a traditional public place such as a movie theatre or sports arena, in a classroom at a school, in a meeting room at a place of business, or a gathering of people in a home theatre. The public can also include a single person using an Interactive system. The term interaction includes, but is not limited to, any interaction between a personal wireless mobile communication device and one or more moving images, still images, multimedia content, and audio content on a display unit, and further includes such things as real-time games, information displays, and downloadable information. The term interaction is further meant to include an interaction between future-developed technologies of personal wireless mobile communication devices and display units. The term incentive includes, but is not limited to, paper coupons, electronic coupons, web-based coupons, multidimensional barcodes, code phrases and priority codes, steganographic visual or electronic signals, orientation authenticated concessions, photographic and graphic data, audio data, print data, promotion codes, and other incentives. The term content includes, but is not limited to, visual content, text content, audio content, video content, and multimedia content, all fully or partially displayable on a display unit.

FIG. 1 illustrates an example of an Interactive system that includes at least one or more servers, a network, a display unit, and one or more wireless devices. The Interactive system of FIG. 1 may be used for entertainment, advertising, information dissemination, meeting and educational purposes, combinations of the foregoing, and many other purposes and combinations thereof. Specifically, referring to FIG. 1, an Interactive system 100 includes a local server 160. The local server 160 is wirelessly coupled to one or more personal wireless mobile communications devices 150. The local server is further coupled to a display unit 180. In another example Interactive system, the local server is coupled to a mechanical-electrical device 185 whose primary purpose is not the display of video data. For example, the local server may be connected to crane arms, remote control vehicles, remote control airships, cameras, lighting displays, and/or a t-shirt cannon, just to list a few examples. While this disclosure deals primarily with personal wireless communication devices, other mobile devices that do not include communication capabilities also could be used, such as a personal mobile gaming device.

In an example system, the local server 160 is configured to transmit content to the display unit 180. In another example system, the local server 160 is configured to transmit control signals to the mechanical-electrical device 185. The personal wireless mobile communication device 150 is configured to transmit a short-range wireless signal 155 to the local server 160. Unlike other communication signals transmitted by the personal wireless mobile communication device, the short-range wireless signals 155 do not count towards a user's allotment of communication or data minutes. Moreover, the short-range wireless signal allows the Interactive system to function in a real-time manner. The local server 160 receives this wireless signal 155 from the personal wireless communication device 150, and the local server 160 alters the content on the display unit 180, by altering the state of the simulation, game, or other experience in the Interactive environment, based on the wireless signal 155 from the personal wireless communication device 150. This alteration of the content on the display unit 180 creates an interaction between the personal wireless mobile communication device 150 and the content on the display unit 180, and potentially, as will be disclosed in more detail below, a multimedia interaction experience between a plurality of persons at a plurality of locations each using their personal wireless mobile communications devices.

In a particular embodiment, the local servers 160 are capable of delivering high-definition progressive video content to a variety of display units ranging from TVs and plasma monitors to projectors and stadium JumboTron® display units using built-in component, HDMI, or DVI outputs. As new technologies emerge, the local servers can be reconfigured to communicate with the new technologies. The local servers function to provide one or more of the management and negotiation of user connections; user input aggregation and feedback; data and media distribution and synchronization; advertising and usage accounting; real-time Interactive simulation; Interactive program scheduling and maintenance; user profiling and segmentation for advertising and content optimization and customization; transaction security and auditing; media integration; control signal processing; and graphics rendering and output. An authorized third party can administer all of the Interactive servers remotely via a web-interface from anywhere in the world or directly through a local Wi-Fi or Ethernet network connection on each local server.

In another example of the Interactive system 100 of FIG. 1, the system includes one or more signal collectors 140. In one particular example system, there are a plurality of signal collectors that are in communication with a single local server. A signal collector receives the short-range wireless signal 155 transmitted by the personal wireless mobile communication device 150. The signal collector 140 performs some aggregation and physical layer network processing as a function of the short-range wireless signal 155, and based on that processing, transmits information to the local server 160 as a function of the short-range wireless signal. The signal collector 140 provides a layer of abstraction between personal wireless mobile communication devices and a local server, which in turn permits the Interactive system to be more easily adaptable and scalable to future-developed communication protocols and technologies.

In systems in which a plurality of signal collectors are used, the wireless signal collectors 140 are placed throughout the target venue to ensure coverage. Each signal collector integrates signals emitted from multiple participating personal wireless mobile communication devices and negotiates data exchange between the local servers 160 and the client software that has been downloaded onto the personal wireless mobile communication devices 150. The signal collectors 140 can be individually customized and positioned within the target venue to serve multiple wireless protocols (e.g., Bluetooth and Wi-Fi) at the same time. Likewise, the density of the signal collectors per local server 160 can be adjusted to accommodate diverse local usage patterns for everything ranging from smaller ten user locations up to larger 500 user environments. Unlike previous wireless Interactive solutions, each of the signal collector and local server technologies provide the capability to network many more users per server than is currently possible ensuring larger captive and engaged audiences. To scale the Interactive system even further, additional local servers can be networked together to further grow the unique Interactive experiences to accommodate stadium and arena audiences numbering in the tens of thousands.

By offloading processing to the local servers 160, personal wireless mobile communication devices 150 can participate in user experiences that are more complex and in-depth than those possible using traditional managed or ad-hoc networks. The local servers 160 eliminate many of the shortcomings of current wireless mobile interactivity while providing deeper, more consistent real-time Interactive experiences across many applications and compatible devices. Such shortcomings of current wireless mobile interactivity include wireless network latency, bandwidth, and cost; small display and graphic resolution; device processing power; system interoperability and integration, and power consumption. The enhanced processing power afforded by the local servers 160 provides unique gaming, group, and social experiences without having to compromise the quality of the overall experience by scaling down applications to match the lowest common denominator performance specifications of available mobile devices. Also, while upgrades to mobile devices benefit the owners of those mobile devices, upgrades to the Interactive server benefit all participants.

In another example of the Interactive system 100 of FIG. 1, a global server 110 is coupled to the local server 160 through a network 130. The global server 110 can provide video content, general information, scheduling, auditing functions, reporting duties, configuration data, and other control information to the local server 160. A website 107 may be run off the global server. Via the website 107, the owner-operator of the system 100 can permit a third party 120 to supply video content, multimedia content, and other information that will be displayed on the display unit 180 or on a display of the personal wireless mobile communication device 150. For example, a third party could provide advertising content to the system 100 via the website 107. This content could be displayed either on the display unit 180 or the personal wireless mobile communication device 150. In a specific example, that advertisement can be customized to the particular user of the personal wireless mobile communication device 150 through the use of cookies or other unique identifiers, user surveys completed by the user, or some other technique or technology. In another example system, a user may actually be able to choose the information content that is displayed on the display unit 180 or the personal wireless mobile communication device 150. For example, in a movie theatre, before the showing of the feature presentation, a person may choose which upcoming movie previews he would like to view either on the movie screen or his personal wireless mobile communication device. By extension, movie audiences will collectively be able to elect which previews to view on the movie screen in real-time as well.

The local server 160, the personal wireless mobile communication device 150, and the display unit 180, form a local network. This local network provides a means for a plurality of users of personal wireless mobile communication devices to interact with each other, to interact with the content on the display unit, a single user to interact with a local server or a global server, or a combination thereof. The interaction among the plurality of personal mobile communication devices may include a game (such as a game of electronic tag among the users using personal icons on the display unit), and/or a system to interact and meet with one another via the display unit (such as by identifying who is behind an avatar on a display in real-time, and arranging to meet with that person in the lobby after the movie). Also, the interaction may include controlling the mechanical-electrical device 185, such as controlling a blimp at a sporting event, or changing the lighting in a nightclub. These are just some examples, and one of skill in the art will realize there are many interactions that can be implemented by the local network among the users of personal wireless mobile communication devices. The local server, in addition to providing the content to the display unit, may further provide video, audio, image, and other content to the personal wireless mobile communication devices such as ring tones, advertisements, and other information.

The global server 110 and the network 130 form a global network when coupled to one or more local servers 160. The one or more local servers 160 may be located at a single geographic location such as a sports arena or movie complex, or at a plurality of geographical locations such as all the movie theatres of a particular cinema company across the country, all the airport terminals of a particular airline across the country, or all the train stations in a particular geographic area, just to name a few.

The interaction between a personal wireless mobile communication device 150 and a local server 160 is accomplished by client software that is loaded onto the personal wireless mobile communication device 150, which enables the personal wireless mobile communication device to engage in Interactive media on the display unit 180. The signal collectors 140 receive signals from the plurality of wireless devices 150, and the local server 160 processes these signals and alters the display on the display unit 180, thereby creating an Interactive experience for each of the wireless devices 150. The wireless devices 150 may not be at the same geographic location and hence not interacting with the same local server, but since each local server is connected through the network 130, a plurality of display units 180 may display the same content, and each device in any location can interact with that content and the other devices. Moving this interactivity to a group-oriented platform as just described provides users with the human component lacking in most forms of Interactive media. The personal and social dimensions of interactivity should not be underestimated as they have positive societal, physiological, and persistent effects on both direct users and passive audiences alike.

In another example of the Interactive system 100 of FIG. 1, a point of sale device 170 is coupled to the local server 160. The point of sale device can be configured to redeem a sales incentive as a function of the short-range wireless signal transmitted from the personal wireless mobile communication device. For example, in a commercial context, a third party may supply content to the global server 110, the global server 110 transmits the content to one or more local servers 160, and the local server puts the content onto the display unit 180 or the personal wireless mobile communication device 150. Then, as an incentive for interacting with the content on the display unit, receiving the advertisement or other information on the person's personal wireless mobile communication device, or some other activity, the person may be rewarded with a discount that can be redeemed at the point of sale device 170. A person may also receive an incentive for simply logging into the Interactive system 100. In another embodiment, the sales incentive may be redeemed via the website 107, or at a third party place of business such as a retail store.

Figure 2:
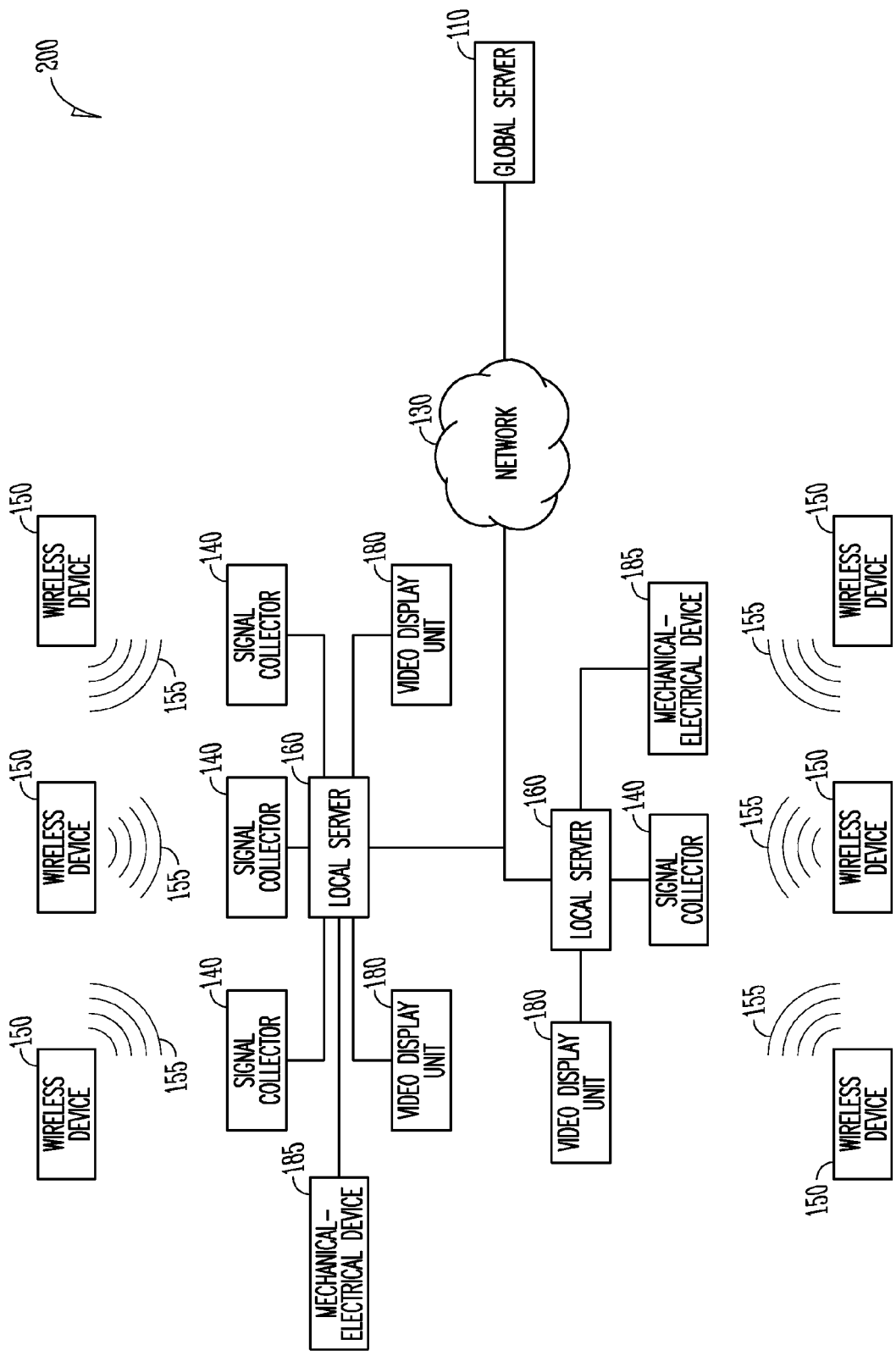
FIG. 2 illustrates another embodiment of an Interactive system.

FIG. 2 illustrates another example of an Interactive system 200. The system 200 of FIG. 2 includes many of the components of the system 100 of FIG. 1 such as the global server 110, the network 130, the local server 160, the signal collector 140, the personal wireless mobile communication devices 150, and the display unit 180. One purpose of FIG. 2 is to illustrate that an Interactive system such as that of FIG. 2 can include a plurality of local servers 160 (either at the same or different geographic location), thereby forming both a local and global network of interconnectivity among a plurality of personal wireless communication devices. The system 200 of FIG. 2 may also include other components such as a third party or web-based user interface and a point of sale device, but these other components are not pictured in FIG. 2 for ease of illustration purposes.

The system 200 of FIG. 2 illustrates that a global server 110 may be coupled to a plurality of local servers 160, and further that a plurality of personal wireless mobile communication devices 150 may be coupled to a plurality of signal collectors 140. The plurality of signal collectors are coupled to a particular local server, which in turn is coupled to one or more display units 180. This architecture of a plurality of local servers coupled among each other allows a plurality of personal wireless mobile communication devices to be coupled among each other. The plurality of personal wireless mobile communication devices may be at the same physical location or at a completely different physical location, such as two different movie theatres at opposite ends of a city. The plurality of personal wireless mobile communication devices may also be located at different parts of the same location, such as in different screening rooms of a multi-screen theatre complex. Through the network of local servers, display units, and personal wireless mobile communication devices, two or more users, at two or more different locations, can participate in the same interaction displayed on different display units. This provides a network among users of the Interactive system that may be used in a variety of different manners such as to create social interactions and relationships.

The Interactive systems 100 and 200 of FIGS. 1 and 2, and other similar systems, turn mobile and wireless devices into more than simple one-to-one communicators and/or personal gaming platforms. Such Interactive systems transform mobile and wireless devices into stateful portable input devices, which users can use to participate in location-based Interactive experiences. Using these Interactive systems, users of wireless and mobile devices are able to use these same devices to interact via an Interactive group context through numerous location-based multimedia outlets including movie screens, kiosks (including kiosks capable of serving multiple users at the same time), digital paper, electronic billboards, plasma TVs, and monitors. These Interactive systems also permit users of wireless and mobile devices to interact with mechanical-electrical devices such as a remote control vehicle at a sporting event.

Client software that is downloaded onto a typical personal wireless mobile communication device 150 transforms these wireless devices into Interactive input devices capable of interacting with the local servers 160 on location or other local servers (and wireless devices) at another location. The client software handles communications with the local servers. In an embodiment, the client software can be downloaded from a website. The website may run on the global server 110. The client software may also be downloaded onto a wireless device 150 from a local server 160, or from any modern cellular data network. The client software may be configured to operate in connection with any local server 160 in the Interactive system, or only particular local servers in the Interactive system based on one or more factors.

The client software abstracts all the functionality needed from host personal wireless mobile communication devices to connect and participate in the Interactive system. This operation provides users of the mobile devices with a consistent and device independent interface that works just as well on a cell phone as it does on a palmtop computer or PDA. The client software provides a consistent and rich feature set. And because the bulk of processing overhead is transferred to the more powerful local servers 160, device power and system requirements of the mobile devices are greatly reduced thereby increasing the variety and number of devices that can be supported by the Interactive system. Older devices incapable of incorporating modern gaming technologies such as the latest 3D graphics, digital sound, and complex Artificial Intelligence in hardware themselves, are still able to fully immerse users in the rich multimedia experiences of the Interactive systems via the client software.

Referring back to FIG. 1, in another example, the website 107 may be directed to those who have interacted with an Interactive system such as the systems 100 and 200 illustrated in FIGS. 1 and 2. Such persons can access the website to receive sales incentives such as coupons. The persons may also receive other rewards for using an Interactive system, such as being able to download material from the website—such as ring tones into their personal wireless mobile communication device. The website may also allow a person to download onto his or her personal wireless mobile communication device the client software that permits the personal wireless mobile communication device to transmit the short-range wireless signals to the signal collectors or local servers. In another example system, the client software may be loaded onto the personal wireless mobile communication device from the local server 160, or over a radio data network via a text message. A personal wireless mobile communication device may also be preloaded with the client software.

The website may further be directed to third parties who supply content to be displayed on the display units 180 or the personal wireless mobile communication devices 150. For example, a third party can provide some sort of entertainment-based content that is to be displayed on the display unit 180, perhaps along with a product placement or some other type of advertising, or an advertisement on the display of the personal wireless mobile communication device.

Figure 3:
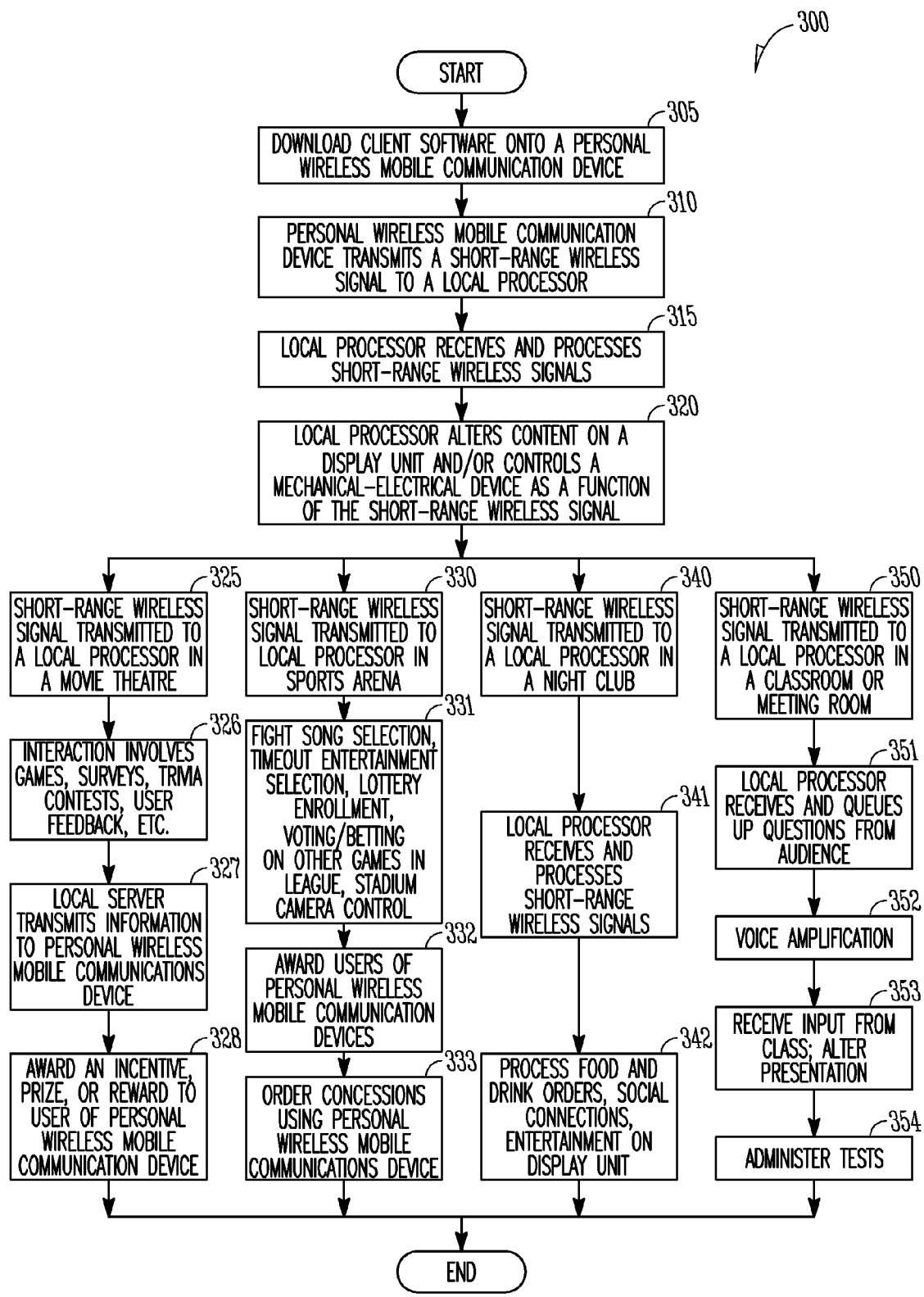
FIG. 3 illustrates an example process of preparing and using a personal wireless mobile communication device to transmit short-range wireless signals in connection with an Interactive system.

FIG. 3 illustrates an example process 300 of loading client software onto a personal wireless mobile communication device, thereby enabling the personal wireless mobile communication device to transmit short-range wireless signals to a processor, further enabling the personal wireless mobile communication device to provide input and interact with a server and/or content on a display unit. At 305, client software is downloaded onto a personal wireless mobile communication device. This download can be performed in several different ways, including from the local server at an onsite Interactive system, from a global processor that is offsite of an Interactive system, and a website that is associated with such an Interactive system. After the client software is downloaded onto the personal wireless mobile communication device, at 310 a user of the personal wireless mobile communication device causes the device to transmit short-range wireless signals to a local server. In another example, the personal wireless mobile communication device transmits the short-range wireless signal to the local server through one or more signal collectors. At 315, the local server receives the short-range wireless signal, and processes that signal individually. The local server can also process that signal in conjunction with other short-range wireless signals that it has received from other personal wireless mobile communication devices. At 320, the local server alters a multimedia or other display on a display unit as a function of the one or more short-range wireless signals that the local server has received from the one or more personal wireless mobile communication devices.

Process blocks 325 through 354 illustrate several examples of how the personal wireless mobile communication device that is downloaded with the client software can be used in its interaction with a local server and/or a display unit. For example, at 325, the personal wireless mobile communication device transmits a wireless signal to a local server, and the local server alters the display on a movie theatre screen in a movie theatre. At 326, it is illustrated that such interactions may include electronic-based games involving one or more personal wireless mobile communication devices in the theatre. Such interactions may also include surveys, user feedback, real-time trivia contests, digital photography and any other types of Interactive sessions among the persons in the theatre. At 327, the local server transmits information to one or more of the personal wireless mobile communication devices in the theatre. Such information may include an advertisement that may be displayed on the personal wireless mobile communication devices. At 328, the local server informs one or more users of the personal wireless mobile communication devices that based on their participation in the Interactive session, they have received an award or other prize that may be redeemed either at the theatre or through some other means such as via a website.

At 330, a plurality of persons in a sports arena transmit short-range wireless signals from their personal wireless mobile devices to a local server that alters a display on a JumboTron® display unit or scoreboard, concourse monitor, information display outside the arena, concession display, team store displays, or other display unit in the arena, or that results in some other action or event occurring in the arena based on the input from one or more personal wireless mobile communication devices in the arena. In an embodiment, signal collectors located throughout the arena collect, process, and transmit the signals to the local server. As illustrated at 331, the interaction among the plurality of wireless devices in the arena and the JumboTron® display unit or other display unit can include such things as choosing which fight song to be played, voting on the entertainment to be supplied during timeouts (e.g., mascot antics versus a cheerleader performance), selecting which camera to display on the JumboTron® display unit, entering a lottery or other contest wherein persons are selected to meet players after the game, and gathering and displaying the input of the crowd on who they think will prevail in the games throughout the league on that day. At 332, one or more persons in the arena receive rewards for participating in the interaction in the arena, such as receiving free tickets to a future event, receiving an upgrade in seating, and receiving a discount on concession items. At 333, a person in the arena orders concessions from his or her seat using the ability of the personal wireless mobile communications device to transmit short-range wireless signals. Such an order need not interact with the JumboTron® display unit or other display unit in the arena, but rather need only interact with an appropriate local server in the arena.

At 340, a plurality of persons in a nightclub use their personal wireless mobile communications devices to transmit short-range wireless signals to a local server. At 341, the local server receives and processes the short-range wireless signals. As shown at 342, this processing can be used for many ends such as processing food and drink orders in the nightclub, providing a means for people to meet each other in the nightclub, providing entertainment via a video display unit in the nightclub, providing patrons with passwords to access VIP areas, selecting karaoke participants, and receiving and processing music requests.

At 350, a plurality of personal wireless mobile communication devices transmit short-range wireless signals to a local server thereby enabling an interaction between the personal wireless mobile communication devices and a display unit in a classroom, corporate, or other meeting setting. At 351, the local server receives and queues up questions from the audience. At 352, the local server and client software provide amplification means via the personal wireless mobile communication device for a person asking a question. At 353, an instructor, teacher, or speaker can solicit and receive input from the audience via the personal wireless mobile communication devices, and use that input in furthering the class instruction or meeting presentation. At 354, in a classroom setting, tests can be administered using the ability of the personal wireless mobile communication devices to transmit short-range wireless signals. Once again, FIG. 3 illustrates only some example embodiments. Also, for each example embodiment illustrated in FIG. 3, not all the steps need to executed, and the steps need not be executed in the exact order listed in FIG. 3.

The enhancement of classroom or meeting presentations with real-time polling or queuing may be implemented using application plug-ins to communicate with the local server(s) 160, and persons with wireless mobile devices 150 can integrate, chart, and record feedback directly into various industry leading office suite applications increasing productivity and ensuring dynamic and relevant data visualization. For example, a presenter can have the audience rate a new product design on a scale of 1-10 and then see the statistics displayed in real-time within the presentation as users submit their ratings via their wireless mobile devices. The presenter can use this real-time empirical data to shape the rest of the presentation. Additionally, question and answer sessions can be enhanced and made more efficient using a visional record of where the user is in the question queue.

The process 300, and in particular the operations 325-354, illustrate only several examples of the many uses to which a personal mobile wireless communication device that is downloaded with client software may be put. Those of skill in the art will realize that many other uses will benefit from the personal wireless mobile device's ability to transmit real-time short-range wireless signals.

For example, the Interactive system can be used in connection with digital maps, queues, and general information sources. The local server can be used to provide rich multimedia information to enhance common tasks. For example, "You are here" maps in shopping malls, airports, and other public places can be enhanced to include downloadable directions, route finding, and tightly targeted advertising that suggests complimentary stores, sales, and services.

Other example uses of the Interactive system include the ability of a person to track his or her position in line and hint at that person's needs at the supermarket or division of motor vehicles (DMV) directly from the personal wireless mobile device so that that person can better utilize his or her time while in line. Also, the Interactive system can be coupled to elevators and shuttles to make them more efficient by plotting optimal routes based on information that a person submits before that person boards.

In at least one example system, an Interactive system defines real-time interactivity as the ability to respond to user input in less than 50 milliseconds. Response times slower than this result in perceptible delays and sluggishness in the Interactive user experience, which greatly reduces the effectiveness of Interactive media. Mobile data and short message service (SMS) are other technologies that claim to be "real-time", however, while these high latency store-and-forward technologies appear instantaneous, they are actually over an order of magnitude slower than the real-time standards that the Interactive system of the present disclosure is capable. Moreover, since message delivery is best effort, there are no guarantees that messages will actually be delivered, and delayed or complete message loss is not uncommon, particularly when sending between networks. SMS messages can reach their destination in as little as a second to upwards of hours later depending on network congestion.

Consequently, superior real-time performance provides the Interactive system of the present disclosure with a competitive advantage that further elevates its Interactive platform to a class unto itself. Imagine trying to drive a car, hit a ball, or win a jeopardy-style trivia contest, where timing is everything, with an observable delay between your action and its result. While best case multi-second delays may be acceptable for older turn-based games (e.g., chess, poker, and untimed trivia) and asynchronous communication (e.g., email, text messages, and web access), they are unacceptable for the more engaging forms of gaming (e.g., sports, driving, and action) and interactivity (e.g., project collaboration, voice projection, and remote control) that consumers increasingly demand.

The Interactive system is not dependent of any one technology. The robust modular design of the Interactive system architecture allows adaptation, scaling, and upgrades to be implemented seamlessly with new technologies and changes in consumer behavior ensuring future sustainability and growth. For example, at the current time, Bluetooth short-range wireless technology is the most widely supported, versatile, and secure wireless standard on the market. Bluetooth technology operates in the 2.4 GHz range, one of the unlicensed industrial, scientific, medical (ISM) radio bands. As such, there is no cost of the use of Bluetooth technology providing both users and producers alike with cost free interactivity. While a person must subscribe to a cellular provider to use GSM, CDMA, or other derivative data services, with Bluetooth technology, there is no cost associated with use beyond the initial cost of the device. As with Bluetooth technology, radio frequency (RF) technologies, such as Wi-Fi, also work in the 2.4 GHz range and provide cost free communication for both users and producers. Wi-Fi technologies currently offer bandwidth advantages over Bluetooth. Wireless USB, Wireless FireWire, and other emerging Wi-Fi standards, such as WiMax and Software-Defined Radio, could be adopted if they gain industry acceptance and propagate.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). Consequently, a machine-readable medium can be either tangible or intangible in nature.

The invention claimed is:

1. A system comprising:
a public display unit;
a personal wireless mobile communication device;
a local server, the local server coupled to the public display unit; and
a signal collector, the signal collector coupled to the personal wireless mobile communication device and the local server;
wherein the local server is configured to provide content to the public display unit;
wherein the personal wireless communication device is configured to transmit a short-range wireless signal to the signal collector, and wherein the signal collector is configured to transmit information to the local server as a function of the short-range wireless signal; and
wherein the short-range wireless signal is for creating an interaction between the personal wireless mobile communication device and the public display unit; and
comprising a plurality of signal collectors and a plurality of personal wireless mobile communication devices, wherein each of the plurality of personal wireless communication devices is configured to transmit the short-range wireless signal to one or more of the plurality of signal collectors; wherein the plurality of signal collectors transmits information to the local server as a function of the plurality of short-range wireless signals; and further wherein the local server processes the plurality of short-range wireless signals and alters the content on the public display unit as a function of the processing of the plurality of the short-range wireless signals.

2. The system of claim 1, further comprising a global server, the global server coupling the local server with one or more other local servers, the one or more other local servers associated with one or more other public display units.

3. The system of claim 1, further comprising a point of sale device, the point of sale device coupled to the local server.

4. The system of claim 1, wherein the public display unit includes one or more of a movie theatre screen, a JumboTron® display unit, a large HD display unit, a display unit in a commercial establishment, an electronic billboard, an electronic poster, a kiosk, a display unit in a classroom, and a display unit in a transportation vehicle.

5. The system of claim 4, wherein the system is further configured to display the interaction on the movie theatre screen prior to a feature presentation.

* * * * *